May 31, 1966 C. C. LUND 3,253,577
TURKEY LOADING APPARATUS
Filed March 27, 1964 6 Sheets-Sheet 1

INVENTOR.
CLIFFORD C. LUND,
BY
McMorrow, Berman & Davidson
ATTORNEYS

May 31, 1966

C. C. LUND 3,253,577

TURKEY LOADING APPARATUS

Filed March 27, 1964

INVENTOR.
CLIFFORD C. LUND,

BY

*McMorrow, Berman & Davidson*
ATTORNEYS.

May 31, 1966          C. C. LUND          3,253,577

TURKEY LOADING APPARATUS

Filed March 27, 1964          6 Sheets-Sheet 3

INVENTOR.
CLIFFORD C. LUND,
BY
*McMorrow, Berman & Davidson*
ATTORNEYS.

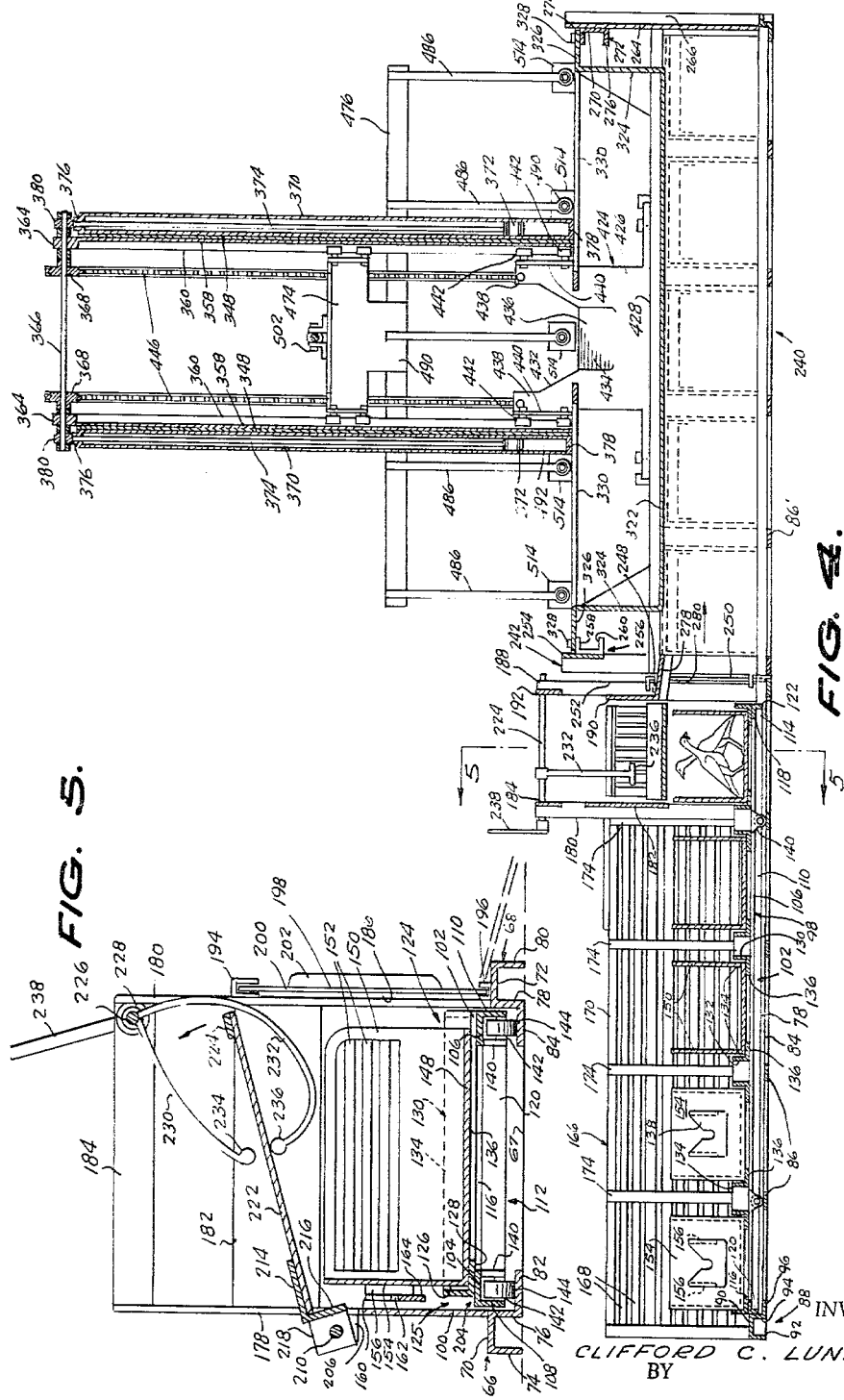

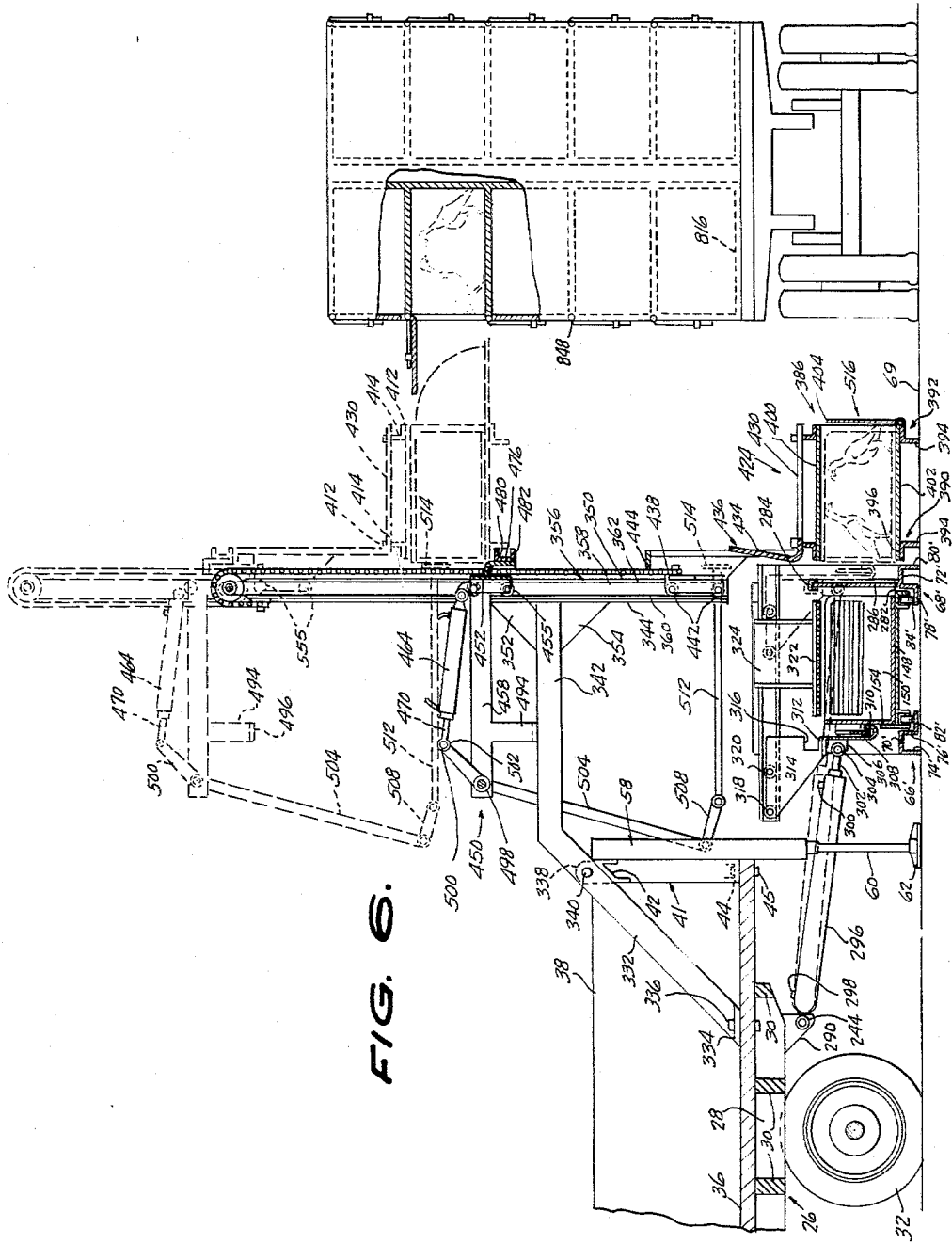

May 31, 1966  C. C. LUND  3,253,577
TURKEY LOADING APPARATUS
Filed March 27, 1964  6 Sheets-Sheet 6

INVENTOR.
CLIFFORD C. LUND,
BY
McMorrow, Berman & Davidson
ATTORNEYS.

United States Patent Office 3,253,577
Patented May 31, 1966

3,253,577
TURKEY LOADING APPARATUS
Clifford C. Lund, Box 384, Moroni, Utah
Filed Mar. 27, 1964, Ser. No. 355,357
6 Claims. (Cl. 119—82)

This invention relates to the general field of animal husbandry and, more specifically, the present invention pertains to a means, device or apparatus to effect the efficient handling of poultry in the loading thereof at a farm site for subsequent transportation to a market, distributor or retail outlet.

Over the recent years there has been an ever increasing demand for poulty by the general public which has led, not only to a large increase in the number of birds daily sent to market with attendant lowering of price, but has brought about new techniques in the breeding, feeding and hatchery practices to accommodate the public demand. However, despite the keen competition in the care and feeding of poultry, but little attention has been given to the problems involved in moving the poultry from the farm to an outlet source, and such problems are far from being insignificant.

For example, the general practice in handling a large number of fowl is to truck a number of crates to an enclosure having a limited area, and to employ help to physically grasp the birds individually, after which the birds are placed in given crates.

The handling of the poultry by personnel not only materially increases the expense involved in the operation of raising the fowl and getting it to market, but it also creates certain hazards with respect to the hired personnel as well as to the fowl, especially in the crating of large birds, such as, for example, turkeys.

As is well-known, all fowl, upon capture, will inevitably beat their wings in an effort to escape. The flailing of the wings can, and frequently does, permit the captured bird to strike its wings against the face, torso and appendages of the handler with such force as to cause physical injury. Again, the erratic movements of the bird, after capture, sometimes result in self-inflicted contusions, broken legs and wings, which, in turn, materially affects the grading of the birds when dressed.

Again, the problem of crating large fowl for shipment is not inconsequential, for under the present-day practices, the crating of such fowl is largely a haphazard operation with wide variations encountered in the number of fowl loaded per crate. Frequently the overloading of crates offers a maximum opportunity for the birds to suffer physical injury, and the under-loading increasing transportation costs.

These are but a few of the disadvantages experienced in the handling of large fowl preparatory to the actual transport of such birds to a distribution point, and it is a primary object of this invention to obviate the same and substantially all other undesirable practices flowing therefrom.

To achieve the optimum results in the crating of relatively large birds, this invention has, as another important object thereof, the provision of means for effecting the transfer of a flock of poultry from a large enclosure to one of lesser area, thereby increasing the density of the birds, per square foot, to initiate the crating procedure, and simultaneously, finding utility in the subsequent loading of the birds into a series of loading crates in such a manner as to minmize time losses and expenses and without subjecting the poultry to rough handling which could lead to injuries and bruises that result in the down-grading of the dressed birds.

A further object of this invention is to provide a combined conveyor and elevating means for a series of loading crates whereby the series of loading crates are brought into juxtaposition relative to a series of transfer crates.

Still another object of this invention is to provide mobile means for moving the aforementioned series of loading crates and its associated conveyor and elevating means from one site to another, and mobile means to move the series of transfer crates from one locale to another, the mobile means being operable independently of one another.

A still further object of this invention is to provide a first station for loading and conveying loading crates to a second station juxtaposed with respect to the aforementioned transfer crates located at a second station, and to provide means for effecting transfer of said crates from said conveyor to said transfer crates.

This invention contemplates, as a still further object thereof, the provision of apparatus of the type generally described supra, the apparatus being non-complex in construction and assembly, relatively inexpensive to manufacture and maintain, and which is durable in use.

Other and further objects and advantages of the instant invention will become more evident from a consideration of the following specification when read in conjunction with the annexed drawings, in which:

FIGURE 2 is a rear end elevational view of the apparatus shown in FIGURE 1;

FIGURE 3 is a side elevational view of the apparatus shown in FIGURE 1;

FIGURE 4 is a detail cross-sectional view, FIGURE 4 being taken substantially on the line 4—4 of FIGURE 3, looking in the direction of the arrows;

FIGURE 5 is an enlarged detail fragmentary cross-sectional view, FIGURE 5 being taken substantially on the vertical plane of line 5—5 of FIGURE 4, looking in the direction of the arrows;

FIGURE 6 is a detail cross-sectional view, FIGURE 6 being taken substantially on the vertical plane of line 6—6 of FIGURE 2, looking in the direction of the arrows;

FIGURE 7 is an enlarged perspective view of a turkey loading crate;

FIGURE 8 is an enlarged perspective view of the hydraulically-operated means for transferring loaded turkey crates from a second station to their respective transfer crates;

Figure 9:
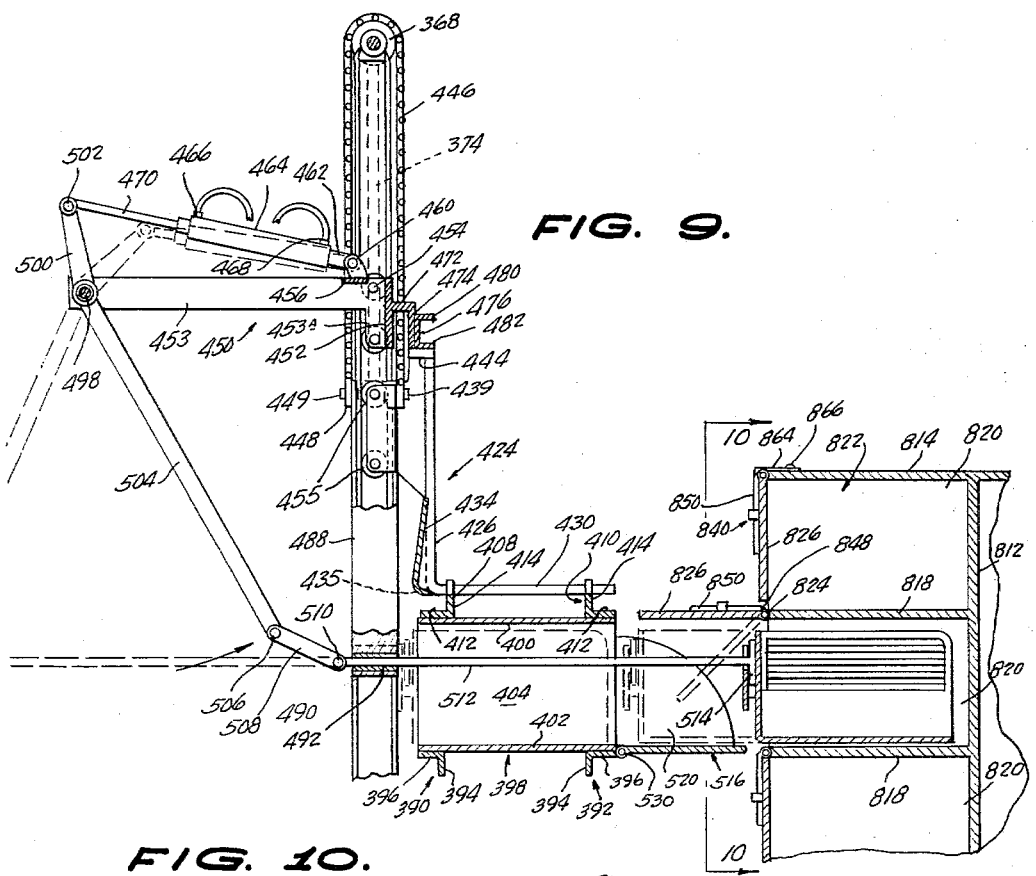
Figure 10:
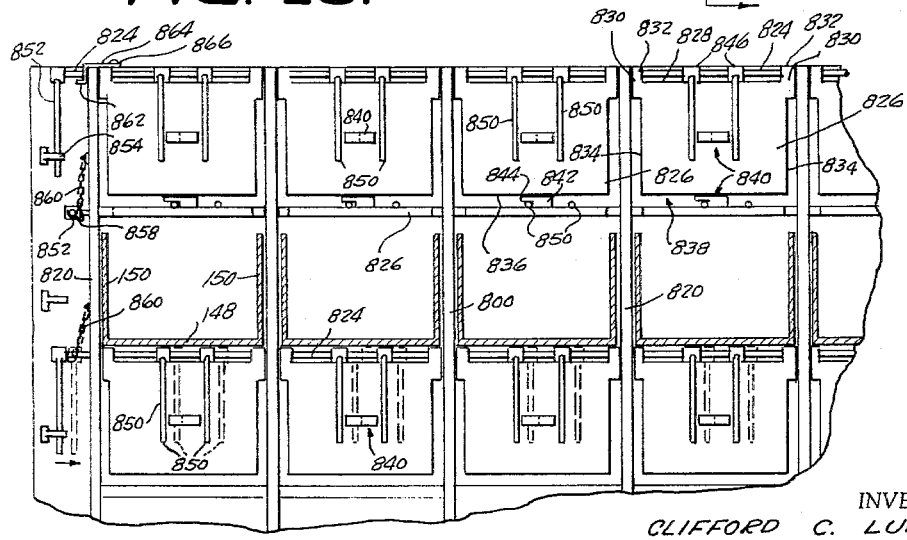

FIGURE 9 is an enlarged fragmentary detail cross-sectional view showing the association of the transfer crates and the elevating mechanism, FIGURE 9 also illustrating the method of transfer of the turkey loading crates from the transfer crates to a tier of transport crates; and FIGURE 10 is a fragmentary side elevational view, partly in cross-section, and illustrating the association between the transfer and transport crates when in operative position, FIGURE 10 being taken substantially on the vertical plane of line 10—10 of FIGURE 9, looking in the direction of the arrows.

Before explaining in detail the elements and apparatus of the present invention, it is to be understood that the invention is not limited in this application to the details of construction and arrangement of parts illustrated in the accompanying drawings, since the invention is capable of other embodiments and of being practiced or carried out in various manners. It is also to be understood that the phraseology or terminology employed herein is for the purpose of description and not of limitation.

Referring now more specifically to the drawings, reference numeral 20 designates, in general, a turkey loading machine or apparatus constructed in accordance with the teachings of this invention. As is shown in the drawings, the machine or apparatus 20 comprises a conventional motor-driven truck 22 (shown in part) which includes the usual truck body 24 having a chassis 26 also of conventional construction, the chassis 26 including a pair of longitudinally-extending, oppositely-disposed, laterally-spaced and substantially parallel rectangular side frame members 28, and a plurality of longitudinally-spaced, transversely-extending, substantially parallel and rectangular cross frame members 30. The usual wheels 32 connect through conventional suspension means 34 (see FIGURE 3) with the chassis 26.

The truck 22 is provided with a conventional normally horizontal, substantially rectangular bed 36 from the longitudinally-extending marginal edges of which upwardly project a pair of elongated, laterally-spaced and substantially parallel sidewalls 38, 40.

To serve a purpose to be described, an inverted substantially U-shaped brace is indicated at 41, the brace 41 including a bight 42 from the remotely-disposed ends of which depend a pair of spaced and parallel side arms 43. The side arms 43 terminate at their respective lower ends in laterally-offset ends 44 secured by bolts 45 to the bed 36 adjacent the rear end thereof, and may optionally be rigidly secured to the sidewalls 38, 40, if so desired. As is seen in FIGURE 6, the bight 42 is downwardly and forwardly-inclined relative to the bed 36 for reasons to be made more apparent, infra.

To the sidewall 40 is fixedly secured a conventional valve bank 46 (see FIGURE 3) which includes a plurality of valves (not shown) controlled by valve-control handles 47, 48, 49 and 50. Reference numeral 52 denotes a high-pressure fluid conduit having one of its ends connected with the outlet side of a conventional hydraulic pump (not shown), and its other end connected to the inlet side of the valve bank 46. Reference numeral 54 designates a low-pressure hydraulic fluid conduit having one of its ends connected with the low pressure or suction side of a hydraulic pump, and the other end thereof connected to the outlet side of the valve bank 46.

To serve a function to be described, a pair of laterally-spaced vertically-elongated and substantially parallel hydraulic cylinders 58 are rigidly secured, respectively, to the arms 43 of the brace 41. Each of the cylinders 58, respectively, includes an extensible and retractable piston rod 60 having an enlarged substantially rectangular foot 62 fixedly secured to the outer end thereof. The hydraulic cylinders 58 and associated elements 60, 62 comprise stabilizing means, the function of which will be detailed below.

Reference numeral 64 indicates a first loading station which is seen to comprise a pair of identically constructed, longitudinally-extending, laterally-spaced and substantially parallel ground-engaging conveyor tracks 66, 68, the ground being indicated by the ground line 69. Preferably, the tracks 66, 68 should be disposed on relatively level ground, although within reason, and due to the flexibility of the tracks, the apparatus will function in its intended manner if the ground is somewhat uneven.

The tracks 66, 68 include (see FIGURE 5) an elongated inverted substantially U-shaped pair of channel members having bights 70, 72, respectively, from the longitudinally-extending marginal edges of which downwardly project a pair of longitudinally-extending, laterally-spaced and substantially parallel side arms 74, 76 and 78, 80, respectively. The side arms 76, 78 terminate in outwardly-turned, integrally-formed, laterally-spaced and confronting ground-engaging rails 82, 84, respectively. Cross-ties 86, having a substantially flat rectangular configuration, extend between the rails 82, 84 and are secured thereto in longitudinally-spaced and parallel relation relative to one another. At their outermost ends the tracks 66, 68 connect to the opposed ends of an inverted substantially U-shaped channel member forming an end cross-tie 88 having a bight 90 from the longitudinal marginal edges of which depend a pair of side arms 92, 94. The side arm 94 terminates in a flange 96 disposed in confronting relation relative to the adjacent one of the cross-ties 86 (see FIGURE 4).

An elongated conveyor carriage frame support is indicated at 98 (see FIGURE 1), the frame support comprising a pair of elongated, laterally-spaced, inverted and reversed, substantially L-shaped side frame members 100, 102 (see FIGURES 4 and 5) having horizontally-disposed and confronting foot portions 104, 106, respectively, from the remotely-disposed longitudinally-extending marginal edges of which depend leg portions 108, 110, respectively. Extending transversely across each adjacent pairs of ends of the side frame members 100, 102 and rigidly connected thereto is an inverted and reversed L-shaped cross frame member 112, 114, respectively (see FIGURES 4 and 5), which include confronting foot members 116, 118 disposed in the same plane as the foot portions 104, 106, and integrally-connecting depending leg members 120, 122, the latter serving as stop means in a manner to be described.

Reference numeral 124 connotes, in general, a plurality of upwardly-opening substantially U-shaped conveyor trays (see FIGURE 1) each of which comprises an L-shaped bight 125 having an upstanding leg section 126 integral with an inwardly-extending foot section 128, and the bight 125 is integrally-connected to a pair of spaced and parallel L-shaped arms 130, 132 each formed with upstanding leg sections 134 and inwardly-extending confronting foot sections 136, respectively. Substantially rectangular spacer and reinforcing blocks 138 extend between and are rigidly connected to the adjacent leg sections 134 of each adjacent pair of ends thereof at the opposed open and closed ends of the trays 124. As is seen in the drawings, the foot sections 128 are rigidly secured to the foot portions 104, 106, and extend therebetween.

At longitudinally-spaced intervals the foot portions 104, 106 are provided with downwardly-depending standards 140 disposed in spaced and parallel relationship relative to the adjacent leg portions 108, 110, and between which is mounted a shaft 142 that carries a roller 144, the latter engaging and tracking the rails 82, 84.

The trays 124 are each adapted to removably receive a loading crate designated by the general reference numeral 146. Each loading crate 146 comprises an elongated substantially rectangular base plate 148 from the longitudinally-extending marginal edges of which arise integrally-formed longitudinally-extending laterally-spaced and substantially rectangular sidewalls 150, each being slatted longitudinally at 152 adjacent the respective upper ends (see FIGURES 5 and 7). The front end of each of the crates 146 is closed by a substantially rectangular face plate 154 integral with the front marginal edge of the base plate 148 and with the adjacent pair of ends of the sidewalls 150. Each of the face plates 154 is provided with a pair of outwardly-projecting vertically-extending substantially rectangular and parallel spacer bars 156 to the outer sides of which is fixedly connected the vertically-extending marginal edges of handle means comprising an upright substantially rectangular hook plate 158. The upper end of the hook plate 158 is formed with a downwardly-extending V-shaped notch 160 which is in open communication at its apex end with a substantially cylindrical, transversely-extending opening 162. To serve a function to be described, the lower end of the hook plate 158 is formed with a lip portion 164 which projects below the lower ends of the spacer bars 156. Thus, the crate 148, as described above, is seen to be open at its top and at that end oppositely-disposed with respect to the face plate 154.

Figure 1:
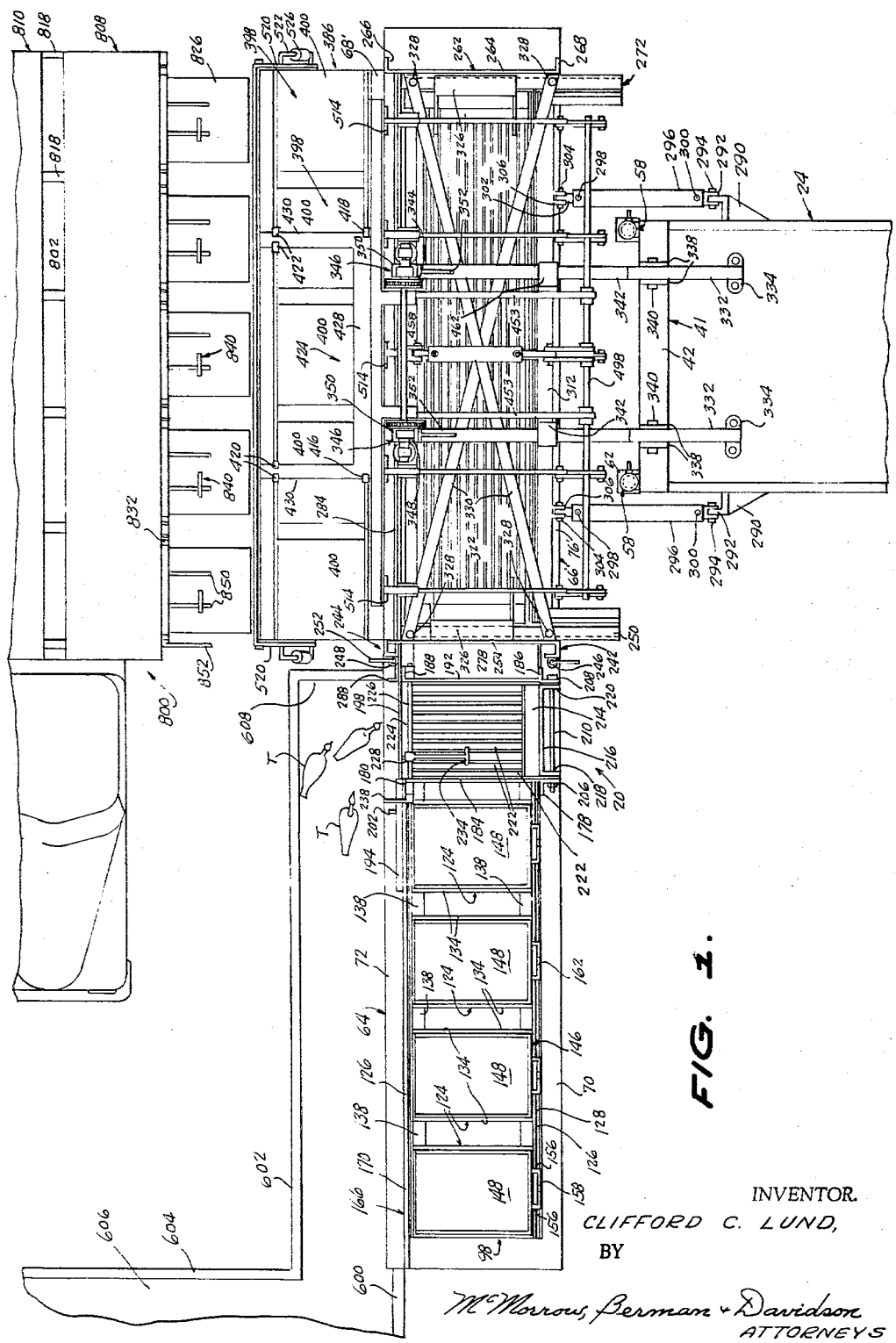
FIGURE 1 is a top plan view of a turkey loading apparatus in accordance with this invention.

Reference numeral 166 denotes, in general, an elongated, upright partition wall or slatted fence which includes a plurality of vertically-spaced, horizontally-extending, parallel slats 168, and top and bottom slats 170, 172, respectively. The slats 168, 170, 172 are fixedly secured to upright standards 174, the lower ends of the standards 174 being rigidly connected to the bight 72 of the track 68. As is seen in FIGURES 1 and 2, the partition wall or slatted fence 166 extends inwardly from the outer end of the first loading station 64.

Reference numerals 178, 180 denote a pair of vertically-elongated upright, substantially rectangular frame members disposed in laterally-spaced, parallel and confronting relation (see FIGURE 5), the lower ends of the frame members 178, 180 being fixedly secured to the bights 70, 72 of the tracks 66, 68, respectively. As is seen in FIGURE 4, the inner ends of the slats 168, 170 and 172 terminate adjacent the frame member 180 to which they may be, optionally, fixedly secured. Extending between and fixedly connected to the frame members 178, 180 are a pair of vertically-spaced, elongated, substantially rectangular panels 182, 184 with the lowermost panel 182 being spaced above the tracks 66, 68 a sufficient distance to permit the crates 146 to pass thereunder.

Longitudinally-spaced from the frame members 178, 180 relative to the tracks 66, 68 and projecting from their respective bights 70, 72 are a second pair of elongated, substantially rectangular, parallel and confronting frame members 186, 188, and extending therebetween and fixedly secured thereto are a pair of panels 190, 192, the panel 190 also being spaced above the tracks 66, 68 to permit the crates 146 to pass thereunder.

An inverted substantially U-shaped guide member 194 is fixedly secured to the slat 170 adjacent the inner end thereof, and a substantially U-shaped guide member 196 is fixedly secured to the bight 72, the guide members opening toward one another. The guide member 196 slidably receives the lower edge of a horizontally-elongated, substantially rectangular gate 198, the upper edge of which is provided with upwardly projecting, substantially rectangular tab 200 (see FIG. 2) slidably engaging within the guide member 194. The outer end of the gate 198 is formed with a laterally-projecting manually-operable handle 202 whereby the gate 198 may be reciprocated across the opening between the frame members 180, 188 to serve a function to be described.

A substantially rectangular end wall 204 extends between the lower ends of the frame members 178, 186 and is fixedly secured thereto and to the bight 70 of the track 66 (see FIGURE 5). Spaced vertically above the upper end of the end wall 204 are a pair of substantially rectangular standards 206, 208 fixedly secured to the frame members 178, 186 (see FIGURE 1) and which project laterally and away from the tracks 66, 68. Extending between and supported on the standards 206, 208 is a shaft 210. Reference numeral 212 denotes an elongated, substantially L-shaped bracket having a leg portion 214 and a foot portion 216, and from the opposed ends of the latter outwardly project a pair of ears 218, 220 which are journaled for pivotal movement on the shaft 210. To the underside of the leg portion 214 is fixedly secured one of the ends, respectively, of a plurality of elongated, substantially rectangular slats 222. The other ends of the slats 222 are rigidly connected together by means of a substantially rectangular, transversely-extending cross brace member 224.

The panels 184, 192 at those ends thereof adjacent the track 68 rotatably support the opposed ends of a shaft 226 on which is fixedly connected a collar 228. Projecting radially from the collar 228 are a pair of substantially arcuate levers 230, 232 which, at their respective outer free ends, terminate in a pair of transversely-extending cross-heads 234, 236. As is clearly shown in FIGURES 1 and 5, the arcuate levers 230, 232 have the major portions thereof disposed above and below the slats 222, whereby the cross-heads 234, 236 may be, alternately, brought into engagement with the slats 222 to effect a rotation thereof about the shaft 210. One end of a lever 238 is fixedly secured to one end of the shaft 224 in order to effect a pivotal movement thereof and consequently of the collar 228, and as the collar 228 turns, the arcuate levers 230, 232 will be rotated in either a clockwise or a counterclockwise direction corresponding to the direction of the movement of the lever 238. This action will, it will be observed, cause either of the cross-heads 234 or 236 to engage against the slats 222, whereby the same are caused to rotate in a direction opposite that of the rotation of the arcuate levers 230, 232, whereby the slats 222 will be pivoted toward or away from the tracks 66, 68 to serve a function to be described.

Reference numeral 240 designates, in general, a second loading station which includes a second pair of elongated, laterally-spaced and substantially parallel tracks 66′, 68′ identical in construction with respect to the tracks 66, 68. Hence, elements of the tracks 66′, 68′ finding counterparts in the tracks 66, 68 have been assigned the same reference numerals with the addition of a prime mark. As is seen in FIGURE 1 of the drawings, the tracks 66′, 68′ are aligned with the tracks 66, 68 and form continuations thereof.

Arising from the inner ends of the bights 70′, 72′ are a pair of L-shaped standards 242, 244 disposed in laterally-spaced substantially parallel and confronting relation. As is seen in the drawings, each of the standards 242, 244 is provided with a pair of vertically-spaced, centrally-apertured lugs 246, 248, respectively. The lugs 246, 248 are adapted to releasably receive therein rods 250 which terminate in handles 252, while the lower ends thereof are adapted to extend through the bights 70, 72 at the inner ends of the tracks 66, 68, whereby adjacent ends of the tracks of the first and second stations 64, 240, respectively, are held in detachable condition. An elongated substantially rectangular cross brace 254 has its opposed ends fixedly secured to the standards 242, 244 adjacent the upper ends thereof, and fixedly secured to the cross brace 254 is a substantially U-shaped trackway 256 (see FIGURE 4). The trackway 256 includes top and bottom flanges 258, 260 to which further reference will be made below.

The bight 70′, at the opposed or outer end of the second station 240, is provided with a substantially U-shaped channel member 262 having a substantially solid bight portion 264 having laterally-projecting sides 266, 268. To the bight 264 adjacent the upper end thereof is fixedly secured the bight portion 270 of a U-shaped channel member 272 having longitudinally-extending, inwardly-projecting top and bottom flanges 274, 276. As is seen in FIGURE 4, the U-shaped channel members 262, 272 are oppositely-disposed and open toward one another to serve a function to be described.

Referring to FIGURES 1 and 4, it is seen that the panel 190 is provided with a substantially rectangular top flange which extends downwardly toward the inner end of the second loading station 240. The opposed ends of the top flange 278 are integral with a pair of longitudinally-spaced and depending reinforcing flanges 280.

A U-shaped guide member 282 is fixedly secured to the bight 72′ and extends between the L-shaped member 242 and the bight 264, and a second inverted U-shaped guide member 284 (see FIGURE 6) extends between the bight 264 and the L-shaped member 242, the guide members 282, 284 opening toward one another to slidably receive therein an elongated substantially rectangular sliding door 286 having a laterally-projecting handle 288 at one end thereof to effect reciprocation of the door 286.

Reference numerals 290 denote a pair of L-shaped brackets rigidly secured to the longitudinally-extending chassis members 28 adjacent the rear ends thereof (see FIGURES 1, 3 and 6), each of the brackets 290 being provided with a rearwardly-projecting ear 292 to which is pivotally connected on pivot pins 294 one of the ends of a pair of hydraulic cylinders 296. Each of the cylinders 296 is provided with ports 298, 300 which open on opposite sides of the usual piston (not shown) mounted for reciprocation within each of the hydraulic cylinders 296. Each of the hydraulic cylinders is provided with an expansible and retractable piston rod 302 which is pivotally connected on pins 304 to clevis means 306 which are, in turn, fixedly connected to an elongated substantially rectangular stem 308 which terminates at its lower end in a J-shaped hook 310. The upper end of the stem 308 terminates in a flange 312 which projects laterally from the stem in a direction away from the J-shaped hook 310. At opposite ends of the flange 312 and projecting upwardly from the stem 308 is fixedly secured the apex end of a plurality of substantially triangular plates 314. Each of the plates 314 is provided with a rearwardly-facing notch 316 adjacent to, but spaced from the flange 312 at the opposed ends thereof, and the base sides of each of the triangular plates 314 has projecting, laterally away therefrom, a pair of shafts 318 (see FIGURE 2), and each of the shafts 318 has rotatably mounted thereon a roller 320. The rollers 320 are adapted to ride within each of the U-shaped channel members 262, 272 with the rollers at one side riding between with the sides 266, 288 of the channel member 262, and at the other side, the rollers 320 ride between the flanges 274, 276 of the U-shaped channel member 272.

From the foregoing it will now be apparent that as the hydraulic fluid enters port 298 the stem 308 and hook 310 will be moved rearwardly to serve a function to be described, and upon the application of hydraulic fluid pressure to the port 300 the piston rod 302 will be retracted, carrying with it the stem 308 and hook 310. From FIGURE 6 of the drawings it will be noted that as the stem 308 and hook 310 are moved rearwardly, the guide member 284 is received within the notches 316 (see the dotted-line position of the triangular plates 314).

Reference numeral 322 denotes an elongated substantially rectangular, slatted top member (see FIGURES 4 and 6) which is fixedly secured at the opposed ends thereof to the lower ends of a pair of substantially rectangular, vertically-extending flanges 324. The upper ends of each of the flanges 324 terminate in diverging, substantially horizontal, rectangular flanges 326 which are fixedly secured to the flanges 258, 274 of the U-shaped channel members 256, 272.

As is seen in FIGURE 1, the flanges 326 are not as long as the flanges 258, 274 and the latter are provided with upstanding substantially cylindrical lugs 328 to serve a purpose to be described.

Referring now more specifically to FIGURE 1 of the drawings, reference numerals 330 designate a pair of cross braces which extend diagonally from the remotely-disposed ends of the flange 258 to the opposed, remotely-disposed ends of the flange 274, and each of the cross braces 330 is fixedly secured to the flanges 258, 274 by the aforementioned lugs 328. It is desirable, but not necessary to the practice of this invention that the cross braces 330 be pivotally connected at their overlapping intersections by a pin (not shown) at the option of the manufacturer.

Referring now more specifically to FIGURES 1, 3 and 6 of the drawings, reference numerals 332 designate a pair of elongated, substantially rectangular beams which project upwardly from the bed 36 adjacent each side thereof and proximate the rear end of the bed. The beams 332 each makes a substantially acute angle with the bed 36, and each of the beams 332, at the lower ends thereof, is formed with lately-projecting flanges 334 which engage against the bed 36 and is releasably secured thereto by means of bolts 336. As is seen in FIGURES 1, 3 and 6, the upper ends of each of the beams 332 are detachably connected between a pair of standards 338 on pins 340. The upper ends of the beams 332 continue into horizontal beam extensions 342 also having a substantially rectangular configuration, the beam extensions 342 projecting rearwardly relative to the bed 36. Each of the outer ends of the beam extensions 342 is rigidly secured to a sidewall 344 (see FIGURE 1) of a pair of spaced and substantially parallel upright channel members 346. Each of the channel members 346 includes a bight 348 and a second sidewall 350 oppositely-disposed with respect to the sidewall 344. To lend rigidity to the connection between the beam extensions 342 and the sidewalls 344, top and bottom substantially triangular gusset plates 352, 354 are fixedly secured thereto, the gusset plates being disposed above and below the beam extensions 342, as is seen in FIGURE 6.

As is seen in FIGURE 6, a second vertically elongated channel member 356 is telescoped, respectively, within each of the channel members 346. The bights 358 of each of the channel members 356 are juxtaposed relative to the bights 348 of their immediately adjacent channel member 346, and the sidewalls 360, 362 of each of the channel members 356 slidably engage against the sidewalls 344, 350 of the channel member 346. The upper end of each of the channel members 356 (see FIGURE 4) is provided with an enlarged boss 364 in which is supported the opposed ends of an elongated shaft 366 which extends therebetween and beyond the remotely-disposed sides thereof. Mounted on the shaft 366 in axially-spaced and confronting relation is a pair of sprocket wheels 368.

Fixedly connected to each bight 348 and extending longitudinally thereof is an elongated hydraulic cylinder 370 having a piston 372 mounted for reciprocation therein. Each of the pistons 372 has an elongated piston rod 374 fixedly connected to one side thereof and projecting through and beyond a cap 376 at the upper end of the cylinder 370. The lower end of the hydraulic cylinder 370 is closed by an end wall 378. The outer end of each piston rod 374 terminates in a boss 380 that receives the outer ends of the shaft 366. Communication with the hydraulic cylinders on opposite sides of the pistons 372 is afforded by the ports 382, 384, the port 382 opening to one side and below the pistons 372, and the port 384 connecting with the other or upper side of the pistons 372 by means of a conventional tube 375. This construction is old and well-known in the art.

Thus, and with the high-pressure fluid being admitted to the underside of the pistons 372, the piston rods 374 are extended upwardly and carry the shaft 366 in the same direction. This, in turn, moves the inner telescoping channel members 356 in the same direction, and the reverse is true when fluid under pressure is admitted to the upper side of the piston 372.

Reference numeral 386 designates an elongated substantially hollow, rectangular transfer crate. The crate 386 comprises a pair of identical longitudinally-extending, laterally-spaced, substantially L-shaped side frame members 390, 392. Each of the side frame members 390, 392 includes a ground-engageable leg portion 394 and a horizontal foot portion 396.

Reference numerals 398 denote, in general, a plurality of identically-shaped, substantially hollow rectangular receptacles having a pair of opposed open ends, the receptacles being arranged in longitudinally-spaced relation relative to the L-shaped frame members 390, 392. Each receptacle comprises a pair of opposed, substantially parallel, elongated, rectangular top and bottom walls 400, 402, and a pair of opposed, elongated, substantially rectangular and parallel sidewalls 404, 406. The opposed ends of the bottom walls 402 extend across and are fixedly secured to the foot portions 396 of the L-shaped members 390, 392.

Reference numerals 408, 410 designate, in general, a pair of laterally-spaced and substantially parallel, elongated L-shaped elements having foot portions 412 fixedly secured to the top walls 400 adjacent their opposed ends. The L-shaped elements 408, 410 also include upstanding leg portions 414. The leg portion 414 of the L-shaped member 408 is provided with a pair of upstanding longitudinally-spaced, confronting L-shaped cleats 416, 418, and the leg portion 414 of the L-shaped member 410 is provided with similar longitudinally-spaced pairs of cleats 420, 422, respectively.

As is seen in the drawings, reference numeral 424 indicates, in general, an L-shaped suspension device comprising a substantially rectangular upstanding plate 426 integrally-connected to a horizontally-extending substantially rectangular flange 428 intermediate the ends of the latter. The outer ends of the flange 428 terminate in rearwardly-projecting substantially rectangular tongs 430 which are releasably secured to the transfer crate 386 by the cleats 416, 418 and 420, 422.

The plate 426 is stamped and cut to form an opening 432 which terminates at its lower end in a forwardly-positioned upset panel 434 having an arcuately-shaped lower end 435. The panel 434 and arcuate lower end 435 cooperate to function as an abutment plate 436 in a manner to be described below. Projecting rearwardly from the arms 438 of the plate 426 are a pair of laterally-projecting flanges 440 each of which supports a pair of vertically-spaced rollers 442 (see FIGURE 6). The rollers 442 are adapted to vertically track between the sidewalls 360, 362 of the pair of channel members 356. The upper ends of each of the arms 438 each terminates in a forwardly-projecting normally-horizontal abutment plate 444 (see FIGURES 2, 3 and 6), and to the upper ends of the arms 438 is fixed secured at 439 one of the ends of a pair of sprocket chains 446 having their respective other ends trained over the sprockets 368 and fixedly connected to a cross brace 448, as at 449. As is seen in the drawings, the cross brace 448 is substantially rectangular in configuration and extends between and is fixedly secured to the upper ends of the sidewalls 344 of the channel members 346 (see FIGURES 2 and 3).

Reference numeral 450 connotes, in general, a substantially U-shaped support frame which includes a vertically-extending substantially rectangular and elongated bight 452 from the opposed ends of which laterally-project a pair of elongated forwardly-projecting substantially rectangular braces 453 disposed in laterally-spaced and substantially parallel relation relative to one another. The inner end of each of the braces 453 terminates in a downwardly-projecting flange 453A which is integral therewith and with the lower end of the bight 452. As is clearly shown in FIGURE 9, the inner end of the braces 453 and the flange 453A have fixedly secured thereon vertically-spaced and substantially parallel shafts 454 on which are mounted rollers 455 which are adapted to track between the end walls 360, 362 of the channel member 356. As is clearly seen in FIGURE 6, the rollers 455 are vertically-spaced above the rollers 442. The opposed ends of an elongated, substantially rectangular brace 456 are connected to the braces 453 adjacent their respective rearward ends, and on the brace 456, substantially centrally thereof, upwardly projects a clevis 458 (see FIGURES 1 and 9) to which is pivotally connected, as at 460, one end 462 of a hydraulic cylinder 464. The hydraulic cylinder 464 is provided with a pair of ports 466, 468 which open through the hydraulic cylinder on opposite sides of a piston (not shown) mounted for reciprocation within the cylinder 464. A piston rod 470 projects longitudinally away from the opposed end of the cylinder 464 to serve a function to be described.

Projecting rearwardly and laterally from the bight 452 is a substantially rectangular flange 472 which terminates in its outer end in a downwardly-depending, substantially rectangular flange 474. Fixedly secured to the flange 474, adjacent the lower end thereof, is a bight portion 476 of an elongated, substantially U-shaped channel member 478 having integrally-formed, longitudinally-extending, laterally-spaced and substantially parallel sidewalls 480, 482.

Projecting laterally from the bight portion 476 at longitudinally-spaced intervals are a plurality of foot sections 484 (see FIGURE 3) of inverted, substantially L-shaped struts 485 having vertically-elongated, substantially rectangular foot portions 486. The lower ends of the leg portions 486 terminate in enlarged hollow tubular bosses 490 through which extend hollow tubular bushings 492 (see FIGURE 9).

The arms 453, adjacent their respective forward ends,
each has rigidly secured thereto the upper ends of a pair of depending spacer members 494, and the latter, at their respective lower ends terminate in diverging substantially rectangular stop plates 496. As is seen in the drawings, the stop plates 496 are adapted to engage against the upper ends of the beam extensions 342. This serves to limit the downward movement of the support frame 450.

An elongated, substantially cylindrical shaft 498 is journaled for rotation within the outer ends of the arms 453 and extends beyond the remotely-disposed sides thereof. A link 500 has one of its ends pivotally connected on a pin which is carried on the outer end of the piston rod 470. The other end of the link 500 is fixedly secured to the shaft 498, whereby, when the hydraulic cylinder 464 is actuated to cause the extension of its piston rod 470, the shaft 498 is swung in a counterclockwise direction, reference being made to FIGURE 9 of the drawings. Of course, when the hydraulic cylinder 464 is actuated in such a manner as to cause the piston rod 470 to be retracted, the shaft 498 is, then, turned in the reverse or clockwise direction.

Fixedly secured on the shaft 498 at longitudinally-spaced intervals are a plurality of second links 504 having lower ends pivotally connected on pivot pin 506 with one end of third links 508. The other ends of the links 508 are pivotally connected on pins 510 to one end of an elongated substantially cylindrical push rod 512 which is mounted for reciprocation within the bushing 492. The outer end of each of the push rods 512 has fixedly secured thereto substantially rectangular abutment members 514, the function of which will be described below.

To serve a function to be described, the rear end of the transfer crate 386 is closed by a single, elongated, substantially rectangular closure plate 516 having an upper edge 518 spaced below the top wall 400 to provide an air space to each of the receptacles 404. To the remotely-disposed ends of the closure plate 516 is fixedly secured a segment-shaped sidewall 520. Fixedly connected to the segment-shaped sidewalls 520 adjacent the upper edge 518 of the closure plate 516 is a downwardly and forwardly-inclined lever 522 having an enlarged head 524 at the free end thereof. Mounted for reciprocation on the lever 522 is a movable weight 526. To the outer ends of the receptacles 404 at the outer ends of the transfer crate 386 laterally project stop elements 528. The arrangement is such that the lower end of the closure plate 516 is hingedly connected to the rear ends of the bottom walls 402 on a shaft 530. Thus, the closure plate 516 may be pivoted from its closed position, as shown in FIGURE 3, to its open position, as illustrated in FIGURE 9, moving the weights 526 axially of the levers 522, and the levers 522, adjacent their free ends, will abut against stop elements 528 to hold the closure plate 516 in substantially horizontal position. When the closure plate 516 is moved to its closed position, the weights 526 will, of course, shift in the opposite direction coming to rest against the enlarge heads 524 and thereby securely hold the closure plate 516 in its upright or closed position.

As is seen in FIGURE 3, of the drawings, conduits 540, 542 connect with the upper and lower ports 59, 59' of the hydraulic cylinders 58 with one valve disposed in the valve bank 46 and controlled by the valve-actuating handle 47. Conduits 544, 546 connect with the ports 298, 300 of the hydraulic cylinders 296 through a second valve of the valve bank 46 controlled by the valve-operating handle 48, conduits 548, 550 connect with the ports 382, 384, respectively, and with a third valve of the valve bank 46 controlled by the valve-operating handle 49, and conduits 552, 554 connect with the ports 466, 468 and with the fifth valve of the valve bank 46 controlled by the valve handle 50.

Referring now to FIGURE 1 of the drawings, reference numerals 600, 602 denote a pair of elongated, vertically-extending fences disposed in laterally-spaced and substantially parallel relation. The fence 602 connects, at one end thereof, with the fence 604 which delineates one end of a field 606 normally employed in the raising of turkeys. The other end of the fence 602 terminates in an inwardly-extending sectional fence 608 which abuts against the track 68 at one side of the opening defined by the frame members 180, 188. As is seen in FIGURE 1, the track 68 at the other end thereof is joined by the fence 600.

Reference numeral 800 designates a conventional automotive truck having the usual horizontal, substantially rectangular and elongated bed 802 supported on a chassis 804, the latter being wheel-supported as at 806 (see FIGURE 3).

Supported on the bed 802 are a pair of identically-constructed tiers of laterally-spaced, longitudinally-extending, substantially rectangular transport crates 808, 810. Since each tier is identical in construction, a description of one is the description of the other.

Selecting tier 808 for descriptive purposes it is seen that the same comprises a horizontally-elongated, vertically-extending, substantially rectangular back wall 812 from which extend vertically-spaced top and bottom walls 814, 816, respectively. If desired, one or more spacer and brace members 818 may be fixedly connected between the top walls 814 of each tier 808, 810, and conventional means (not shown) may be used to secure the bottom walls 816 of the bed 802.

Reference numeral 818 denotes a plurality of horizontal, substantially rectangular, longitudinally-extending and vertically-spaced separator walls which project laterally and downwardly from the back wall 812. Extending between each adjacent pair of separator walls 818 and between the top and bottom walls 814, 816 and the next adjacent separator wall 818 are a plurality of elongated, laterally-spaced and substantially parallel divider walls 820. The above-described construction provides a plurality of outwardly-opening transport crates in each tier, each of the crates being generally designated by the reference numeral 822.

Extending through the divider walls 820 adjacent their respective upper ends and adjacent the open end of each crate 822 is a horizontally-extending shaft 824 journaled for rotation and axial shifting therein.

Reference numeral 826 indicates a substantially rectangular closure member or door having a cut-out 828 extending inwardly from the upper longitudinally-extending edge thereof. The arms 830 at each end of the cut-out 828 are formed with hollow bosses 832 which receive the shaft 824 therethrough. The sides of each closure member 826 are cut out at 834, and the lower end 836 is spaced inwardly away from the bottom wall 816 and separator walls 818 to form a continuous air space 838. An L-shaped latch member 840 is provided for each closure member 826, the latch member 840 being centrally located thereon with a foot portion 842 fixedly secured thereto and the leg portion 844 being disposed in laterally-spaced and horizontal position when the closure member 826 is in its closed position.

Fixedly secured on the shaft 824 for rotation therewith are a plurality of collars 846, there being a pair of collars for each closure member 826. As is seen in FIGURE 10, each pair of collars 846 are disposed between the pairs of arms 830 and has secured thereto the offset ends 848 of a pair of levers 850 which normally engage against the outer side of the closure member 826.

A latch member 854 is fixedly secured to the back wall 812 at an end thereof and normally overlies the lever 852 to hold the same in its downward and locked position.

FIGURE 10 illustrates an upper row of the crates 820, the closure members 826 being disposed in their respective closed positions; in the central row of closure members 826 as shown in this figure, the closure members 826 are illustrated as being in their raised positions; and, the lower row of the crates 820 shown in this figure includes a dotted-line construction which illustrates the shifting movement of the levers 850 just prior to the opening of the closure members 826. Thus, to raise the closure members 826 of any given row of crates 820 simultaneously, it is only necessary to push the lever 852 inwardly to shift the shaft 824 axially whereby the levers 850 are moved to their dotted-line position shown in FIGURE 10, with the left-hand ones thereof engaging below the adjacent leg portions 844 of the latches 840. The selected lever 852 is now pivoted upwardly to swing the closure members 826 of a selected row to their open position after which the hook 858 at one end of a chain 860 is hooked thereunder to hold the lever 852 in this elevated position. The other end of the chain 860 is fixedly secured to the adjacent separator wall 820.

A somewhat different support means is employed for the uppermost row of crates 820. In this instance, the lever 852 is supported in its raised position by means of a hook 862 having a laterally-projecting flange 864 pivotally connected at 866 to the top wall 814.

To lower the closure members 826, it is only necessary to disengage the hooks 858 or 862, lower the selected lever 852, shift the lever 852 in the opposite direction to disengage the levers 850 from beneath the leg portions 844, and to re-engage the lever 852 in its locked position below the adjacent latch 854.

The transport crates 808, 810 are positioned adjacent to, but spaced from the farm site to a distribution center in a manner to be described below.

To utilize the above-described invention, it will be presumed that a plurality of turkeys T have been driven from the field 606 and into the restricted area defined by the slatted wall of the first loading station 64 (of which there may be more than one), and the fence 602. Assuming that all of the component elements of the turkey-loading machine are in their respective positions as illustrated in the drawings, the operator will now grasp handle 202 to open gate 198. This will permit entry of the poultry into the first of the crates 146. When the desired number of turkeys T have been loaded into the first of the crates 146, gate 198 is slid to its closed position and lever 238 is now turned to a counterclockwise direction (reference being made to FIGURE 5) to cause the arcuate levers 230, 232 to turn in the same direction. This movement causes the cross-head 234 to engage against the upper sides of the slats 222, causing the same to pivot in a clockwise direction about the shaft 210 and to close across the upper ends of the sidewalls 150 of the crate 146. It is well-known that turkeys and other similar fowl, when confined in a limited space, tend to extend their necks upwardly. The slats 222 serve the purpose of causing the turkeys to lower their heads to a point substantially flush with the plane of the upper ends of the sidewalls 150 and face plate 154.

The operator now pushes on any one of the crates 146 which are not below the slats 222 and exerts a force thereon toward the right, as viewed in FIGURE 4, and in the direction of the arrow shown therein. The distance moved is just sufficient to cause the second of the crates 146 to confront the opening defined by the upright frame members 180, 188. In making this movement, the first of the crates 146 shifts from the first loading station 64 to the second loading station 240. The handle 238 is now rotated in the opposite direction to cause the cross-head 236 of the lever 232 to engage against the underside of the slats 222 to cause the same to pivot in a counterclockwise direction about the shaft 210 (reference again being made to FIGURE 5), whereby the slats 222 are moved to their elevated position.

The loading of the crates 146 continues in this sequence and eventually, all of the crates 146 are loaded and moved to the second loading position or station 240. As the first and subsequent ones of the crates 146 moves into the second loading station, the depending lip 164 slidably engages within the hook 310 (see FIGURES 6 and 8). After all of the crates 146 have been moved into the second loading station, the sliding door 286 is removed to place the open rear ends of the receptacles 398 in open communication with the transfer crates 386. The handle 48 of the valve bank 46 is now actuated to cause the fluid under pressure to pass through the conduits 544 and into the hydraulic cylinders 296 to cause their respective pistons 302 to extend, and in so extending, force the crates 146 from the trays 124. It will be noted that the spacing between each of the crates 146 is such as to correspond to the spacing between each of the receptacles 398.

It will be understood, of course, that prior to the actuation of the handle 48 of the valve bank 46 the truck 800 has been moved to the position shown in FIGURE 1 so that the tiers of transport crates 808, 810 are juxtaposed with respect to the transfer crates 386. Thereafter, the valve-actuating lever 49 is operated to cause fluid under pressure to pass through the conduit 550 and into the hydraulic cylinders 370, causing the transfer crate 386 to move vertically upwardly. This is accomplished, of course, by the movement of the pistons 372 and their respective associated piston rods 374 in an upward direction which causes the shaft 366 to move upwardly. As the shaft 366 moves upwardly, the chains 446 will engage and pass over the sprockets 368. Since the plate 426 is connected with the chains 446, the plate will move upwardly therewith and will simultaneously raise the tongs 430 to which the transfer crate 386 is detachably connected. As the crate 386 moves upwardly, the lips 164 of the crates 146 are disengaged from the hook 310.

Let it be assumed, at this point, that the lowermost row of transport crates are to be loaded (see FIGURE 3). In this connection it should be noted that as the transfer crates 386 are raised in the manner described above, the hook plates 158 engage the shafts 512, the shafts 512 being received within the openings 162, and the substantially rectangular plates 514 engage between the hook plate 158 and the face wall 154 of the crates 146. In the loading of the first row of transport crates the abutment plates 444 are elevated a distance sufficient to engage beneath the sidewall 482 of the channel member 478. The valve handle 49 is now actuated in such a manner as to cause the piston rod 470 to be extended and through the links 500, 504 and 508, and the shafts 512, is moved from its full-line position shown in FIGURE 3 to its full-line position shown in FIGURE 9, it being understood that the end wall 516 has first been pivoted to its open position. In the selected example, the bottom wall 402 and the wall 516 extend parallel to one another and are aligned with the bottom wall 816. The extension of the shafts 512 pushes the crates 146 away from the transfer crates 386 across the wall 516 and partially into the transport crates 808 or 810. As this movement takes place, the lever 852 is actuated to lower the outer ends of the closure members 826, whereby the closure members 826 are disposed in the path of movement of the end walls 154. Continued movement of the transfer crates 146 causes the end walls 154 to abut the closure members 126, thereby forcing them to pivot downwardly in the transfer crates 146, whereby the end walls 154 push the closure members 826 to their respective closed positions after which they are locked, as described above, behind the turkeys T now transferred to the selected row of transport crates.

The operator now operates the valve-control lever 49 in the opposite direction in such a manner as to cause retraction of the piston rod 470, and this, in turn, results in the withdrawal of the crates 146 from the selected row of the transport crates 808 or 810, the crates 146 again coming to rest within the transfer crates 386. The wall 516 is now pivoted from the position shown in FIGURE 9 to the position shown in FIGURE 3 to close the open rear ends of the transfer crates 386, and the valve lever 50 is now actuated to introduce hydraulic fluid into the cylindrical hydraulic cylinders 370 to cause the pistons 372 to move downwardly, whereby the shaft is lowered until the transfer crates reach the full-line position shown in FIGURE 3.

In making this descent, the hook plates 158 become disconnected from the rectangular members 514 and the equipment is now conditioned to repeat this cycle of operation.

In the loading of any row of the transport crates above the lower ones thereof, it is necessary that the transfer crates 386 be moved to a higher position than that described immediately above. It will be recalled that in the loading of the lower row of transport crates 808, 810 the abutment plates 444 engaged against the sidewall 482 of the channel member 478. Now, in the loading of a higher row of transport crates, the continued admission of hydraulic fluid to the hydraulic cylinders 370 beneath the pistons 372 will force the abutment plates 444 and the engaged sidewall 482 of the channel member 472 upwardly. This movement carries with it the support frame 450. Since the hydraulic cylinder 464, the links 500, 504, 508 and the shafts 512 are all connected together, these elements will move upwardly with the support frame. When the desired row of transport crates has been reached by the transfer crates 386, the hydraulic cylinder 464 is actuated as described above, the wall 516 having been first opened, and the closure members 826 of the selected row of receptacles 822 having been previously opened.

In returning from the second cycle of operation, the transfer crates 386 and the support frame 450 descend together until the flanges 498 re-engage with the beam extensions 342 at which time the transfer crates 386 continue their downward movement until the legs 394 of the L-shaped members 390 engage against the ground indicated at 69.

The forwardly-expressed portion 434 is especially designed to engage against the substantially rectangular members 514 to push the same away from the transfer crates 386 in the event they are not fully retracted after the transfer crates 386 pass below the level of the lowermost row of transport crates 822.

Prior to the operation of the turkey-loading machine 20 the operator operates the valve handle 47 in such a manner as to introduce hydraulic fluid into the hydraulic cylinders 58 to cause extension of the piston rod 60 to such a point that the ground-engaging members 62 abut against the ground 69. These means are employed in order to stabilize, and prevent the truck 22 from pivoting on the wheels 32 due to the weight of the machine 20 and the turkeys T being loaded therefrom. When the machine 20 is to be transported to another locale, the ground-engaging members 62 are retracted.

While only one of the turkey-loading machines 20 has been shown in the drawings, it will be understood that similar means could be employed on the opposite side of the vehicle 800 so that the loading of the tiers 808, 810 could proceed simultaneously.

From the foregoing description of this invention it will be realized that the component elements thereof may be readily disassembled from one another so that the same may be easily transported on the bed 36 of the truck 24 when it is necessary to move the apparatus from one site to another.

Having described and illustrated one embodiment of this invention in detail, it will be understood that the same is offered merely by way of example, and that this invention is to be limited only by the scope of the appended claims.

What is claimed is:

1. A reciprocable conveyor system comprising a plurality of longitudinally-extending laterally-spaced and substantially parallel tracks extending horizontally between and including a loading and unloading station, an elongated carriage mounted for reciprocation on said tracks, a plurality of receptacle means normally positioned at said first station and releasably mounted on said carriage in longitudinally-spaced relation relative thereto, each of said receptacles having adjacent open ends, a first partition means fixedly secured to and projecting upwardly from one of said tracks at said loading station and in spaced confronting relation relative to said open ends of said receptacles, said partition means having an opening formed therein adjacent that end thereof proximate one end of said unloading station, a normally closed closure means for said opening, said closure means being supported on said partition means for movement toward its open and closed positions, said carriage being movable in one direction to consecutively position said open ends of said receptacle means in registry with said opening, said closure means being alternately opened and closed to permit entry and retention of fowl to be conveyed in said receptacle means as said carriage moves from said loading station toward said unloading station, a second partition means being movably supported on and projecting upwardly from said one track, said second partition means being normally positioned across and in registry with said open ends of said receptacle means as said receptacle means is moved from said loading station toward said unloading station, said second partition means being movable from its said normal position to a second position out of registry with said open ends of said receptacles, means connected with said receptacles operable to eject said receptacles laterally from said carriage at said loading station when said second partition means is moved out of registry with said open ends of said receptacles, and means for effecting reciprocation of said carriage.

2. An apparatus for loading poultry for transport from a field to a distribution point comprising an upright partition fence disposed in said field, said fence having an opening extending transversely therethrough adjacent an end thereof, a pair of laterally-spaced and substantially parallel tracks extending parallel to said fence and having a first section thereof juxtaposed with respect to said fence and a second section thereof projecting beyond said one end of said fence, a closure member mounted for reciprocation on one of said tracks and having an end thereof proximate a side of said opening, said first section of said tracks comprising a poultry loading station and said second section comprising a poultry unloading station, an elongated carriage mounted for reciprocation on said tracks, said carriage having a plurality of longitudinally-spaced trays fixedly secured thereto for reciprocable movement therewith, a hollow poultry-receiving crate for each of said trays, said crates being releasably supported on said trays, each of said crates having an open end facing in the direction of said fence, said cariage being movable to successively present the open end of one of said crates in registry with said opening to receive poultry therein when said closure member is in its open position, said closure member being disposed in its closed position when said one crate has received said poultry, said carriage being movable from said first track section together with said crates onto said second track section, a transfer crate comprising a plurality of receptacles having a pair of opposed open ends, a movable closure wall for one of said open ends of said receptacles, said one open ends of said receptacles being normally positioned in confronting relation relative to said reciprocable closure walls, said reciprocable closure wall being movable to its open position to place said open ends of said poultry crates in open communication with said open ends of said receptacles, means coacting with said poultry crates to move said crates from said trays into said receptacles, a tier of movably supported vertically-spaced transport crates disposed in proximity to said transfer crates, said transport crates comprising a plurality of vertically-spaced horizontally-extending rows of substantially hollow rectangular compartments each having a pair of opposed open and closed ends, a closure member for each of said open ends of said compartments, means operable to simultaneously open said closure members of a given row of compartments, means operable to open said closure wall of said receptacles, and means operable to push said poultry crates from said transfer crates into said compartments of said transport crates.

3. A turkey-loading apparatus comprising, in combination, a wheel-supported vehicle having an elongated substantially rectangular and normally horizontal bed and a conveyor system, said system including a pair of laterally-spaced longitudinally-extending substantially parallel tracks, said tracks being supported in a horizontal plane below the plane of said bed and extending perpendicular to said bed adjacent one end thereof, said tracks including a first section comprising a turkey-loading station and a second section comprising a turkey-unloading station, said second section having a portion thereof extending transversely of said bed adjacent one end thereof, a substantially upright fence supported on one of said tracks of said first section, said fence having an opening extending transversely therethrough adjacent said second track section, a closure member mounted for reciprocation on said fence for movement across and away from said opening, an elongated substantially rectangular closure member mounted for longitudinal reciprocation on said one track and disposed in said second section, an elongated carriage mounted for reciprocation on said tracks, said carriage being alternately movable in and out of said first and second stations, a plurality of substantially U-shaped trays disposed on said carriage in longitudinally-spaced relation, each of said trays comprising an L-shaped bight having an L-shaped arm projecting from each of the opposed ends of said bight, said bight and arms opening upwardly and outwardly at one end thereof, a turkey crate for each of said trays, each of said turkey trays comprising a substantially rectangular bottom wall, a pair of laterally-spaced substantially rectangular sidewalls and an upright end wall extending between a pair of adjacent ends of said end walls, handle means fixedly secured to said upright end wall and disposed in laterally spaced relation relative thereto, each of said turkey crates being supported, respectively, on one of said trays with the open ends thereof being adjacent the open ends of said trays, said carriage being movable longitudinally of said tracks to successively present the open ends of said turkey crates in registry with said opening to receive and load turkeys therein when said closure member is moved from across said opening, said carriage being movable into said second section as successive turkey crates are loaded with the open ends of said turkey crates facing said substantially rectangular closure member, an elongated substantially rectangular element extending across said second track section above the loaded turkey crates, means on said tracks supporting said element, a horizontally-elongated substantially hollow rectangular transfer crate having opposed open ends, said transfer crate having one of its open ends disposed in confronting relation with respect to said reciprocable closure member, an elongated substantially rectangular end wall pivotally connected on said transfer crate and normally extending across the other open end thereof, means dividing said transfer crate into a plurality of receptacles, means connected to said vehicle detachably receiving said handle means as said poultry-loading crates move into said second track section, said vehicle connected means being operable to push said turkey-loading crates from said trays into said receptacles of said transfer crate, vertically-reciprocable means supported on said bed adjacent said one end thereof, means connecting said transfer crate with said vertically-reciprocable means, said vertically-reciprocable means being operable to raise said transfer crate and to disconnect said transfer crate from said vehicle connected means, a tier of turkey-transport crates, each of said crates being divided into a plurality of horizontal rows of substantially rectangular compartments, each of said rows of compartments having a pair of opposed open and closed ends, said open ends of said compartments facing toward said transfer crate, closure members for said open ends of each row of said compartments, means operable to simultaneously open said closure members of each of said rows of said compartments, means operable to open said end wall of said transfer crate when said receptacles confront a given row of said compartments, and reciprocable means carried on said support means operable to push said turkey-loading crates from receptacles into said compartments.

4. In the combination as defined in claim 3, and means pivotally supported on said track, said last-named means being adapted for pivotal movement toward and away from the open upper end of the turkey-loading crate being loaded to depress the heads of the loaded turkeys.

5. In the combination as defined in claim 4, wherein said elongated substantially rectangular element supported from said track in said second section is slatted.

6. In the combination as recited in claim 5, wherein said means for pushing said turkey-loading crates from said receptacles into said compartments rise and descend in equal increments with the rise and descent of said turkey-transfer crate.

References Cited by the Examiner
UNITED STATES PATENTS

| | | |
|---|---|---|
| 581,191 | 4/1897 | Bell _____ 217—42 |
| 691,723 | 1/1902 | Martin. |
| 698,782 | 4/1902 | Backus _____ 217—42 |
| 959,121 | 5/1910 | De Young _____ 119—82 |
| 1,148,531 | 8/1915 | Oldham _____ 214—38.22 |
| 1,975,717 | 10/1934 | Harris. |
| 2,675,139 | 4/1954 | Mercier et al. _____ 214—620 |
| 2,812,866 | 11/1957 | Whitehouse et al. _____ 214—29 |
| 3,103,915 | 9/1963 | Crain et al. _____ 119—82 |
| 3,110,388 | 11/1963 | Elliot et al. _____ 119—82 X |

GERALD M. FORLENZA, *Primary Examiner.*